(12) United States Patent
Kawashima

(10) Patent No.: US 8,810,826 B2
(45) Date of Patent: Aug. 19, 2014

(54) PRINTING APPARATUS AND INFORMATION PROCESSING APPARATUS FOR DISPLAYING INFORMATION

(75) Inventor: Tsuyoshi Kawashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1589 days.

(21) Appl. No.: 12/024,040

(22) Filed: Jan. 31, 2008

(65) Prior Publication Data

US 2008/0180744 A1 Jul. 31, 2008

(30) Foreign Application Priority Data

Jan. 31, 2007 (JP) ................................. 2007-022049

(51) Int. Cl.
*G06F 3/12* (2006.01)
*H04N 1/00* (2006.01)
*H04N 1/32* (2006.01)

(52) U.S. Cl.
CPC .... *H04N 1/00347* (2013.01); *H04N 2201/3214* (2013.01); *H04N 1/00437* (2013.01); *H04N 2201/0094* (2013.01); *H04N 2201/3273* (2013.01); *H04N 2201/0084* (2013.01); *H04N 2201/3225* (2013.01); *H04N 1/0035* (2013.01); *H04N 1/00411* (2013.01); *H04N 2201/0087* (2013.01); *H04N 1/32101* (2013.01)
USPC ......................................................... 358/1.15

(58) Field of Classification Search
None
See application file for complete search history.

(56) References Cited

U.S. PATENT DOCUMENTS

| | | | |
|---|---|---|---|
| 6,661,438 B1 * | 12/2003 | Shiraishi et al. | 715/835 |
| 2003/0009469 A1 * | 1/2003 | Platt et al. | 707/100 |
| 2004/0201740 A1 * | 10/2004 | Nakamura et al. | 348/231.3 |
| 2005/0259945 A1 * | 11/2005 | Splaver | 386/4 |
| 2006/0047586 A1 * | 3/2006 | Wolf | 705/27 |

FOREIGN PATENT DOCUMENTS

| | | |
|---|---|---|
| JP | 08-077111 A | 3/1996 |
| JP | 2006081129 A | 3/2006 |

* cited by examiner

*Primary Examiner* — Jeremiah Bryar
(74) *Attorney, Agent, or Firm* — Baker Botts L.L.P.

(57) ABSTRACT

A printing apparatus includes: a display unit; an icon storing unit which stores a plurality of icons and a plurality of dates while being associated with each other; an extracting unit which extracts an icon, which is associated with dates within a time period among a plurality of first time periods, from the icon storing unit; a display controller which controls the display unit to display a plurality of period names corresponding to the plurality of first time periods and the extracted icon; and a selecting unit which selects a period name from among the period names displayed on the display unit; and a printing unit which prints a data file which relates to dates within the time period corresponding to the period name selected by the selecting unit.

16 Claims, 12 Drawing Sheets

| SHOOTING DATE | ● | ■ | ★ | ♪ | ◎ | ☆ | △ | □ | ▼ | ▲ | △ | ○ |
|---|---|---|---|---|---|---|---|---|---|---|---|---|
| ............ | . | . | . | . | . | . | . | . | . | . | . | . |
| 2006/10/3 | F | F | F | F | F | T | F | F | F | F | F | F |
| 2006/10/12 | T | F | F | T | F | F | T | F | F | F | F | F |
| 2006/10/14 | F | F | F | F | F | F | F | F | F | F | F | F |
| 2006/10/22 | F | T | F | F | F | F | F | F | F | F | F | F |
| 2006/10/25 | F | F | F | F | F | F | F | F | F | F | F | T |
| ............ | . | . | . | . | . | . | . | . | . | . | . | . |

SELECTION SCREEN (DAY)

DIGITAL CAMERA PRINTING SCREEN

EVENT ICON SETTING SCREEN

PRINTING APPARATUS AND INFORMATION PROCESSING APPARATUS FOR DISPLAYING INFORMATION

CROSS-REFERENCE TO RELATED APPLICATION

This application claims priority from Japanese Patent Application No. 2007-022049, filed on Jan. 31, 2007, the entire subject matter of which is incorporated herein by reference.

TECHNICAL FIELD

Aspects of the present invention relate to a printing apparatus and an image forming apparatus in which a desired image can be easily found among a large number of images even with a small display area.

BACKGROUND

Recently, a technique for reading images stored in a digital camera or a media card and, based on date information added to the images, displaying thumbnail images in the order of date on a display device such as an LCD has been known. For example, JP-A-2006-81129 describes a related art technique. In the technique, a display of a personal computer connected to a digital camera 1 is divided into a tree area and a thumbnail area, a plurality of year names is displayed in one row in the tree area, a list of thumbnail images of a year selected in the tree area is displayed.

However, in the related art technique described in JP-A-2006-81129, a list of thumbnail images of a selected year is displayed in the thumbnail area, so that when the number of images shot in the year is large, it takes time to find a desired image.

Additionally, as described in JP-A-2006-81129, it is possible that, when the display for displaying the thumbnail images is a display of a personal computer displays the thumbnail images, a large number of thumbnail images are displayed at one time on the display. However, for example, in a display device equipped on a multi-function device having a data communication function with a digital camera or a media card, and a printing function, a display area is smaller than that of the display of a personal computer. Therefore, a large number of thumbnail images cannot be displayed at one time and it takes time to find a desired image.

SUMMARY

Exemplary embodiments of the present invention address the above disadvantages and other disadvantages not described above. However, the present invention is not required overcome the disadvantages described above, and thus, an exemplary embodiment of the present invention may not overcome any of the problems described above.

Accordingly, it is an aspect of the present invention to provide a printing apparatus and an image forming apparatus in which desired image data can be easily found among a large number of images even with a small display.

According to an aspect of the present invention, there is provided a printing apparatus comprising: a display unit; an icon storing unit which stores a plurality of icons and a plurality of dates while being associated with each other; an extracting unit which extracts an icon, which is associated with dates within a time period among a plurality of first time periods, from the icon storing unit; a display controller which controls the display unit to display a plurality of period names corresponding to the plurality of first time periods and the extracted icon; a selecting unit which selects a period name from among the period names displayed on the display unit; and a printing unit which prints a data file which relates to dates within the time period corresponding to the period name selected by the selecting unit.

According to another aspect of the present invention, there is provided an information processing apparatus comprising: a display unit; an icon storing unit which stores a plurality of icons and a plurality of dates while being associated with each other; a display controller which controls the display unit to display a plurality of period names corresponding to a plurality of first time periods; a selecting unit which selects a period name from among the period names displayed on the display unit; and an extracting unit which extracts an icon, which is associated with dates within the time period selected by the selecting unit from the icon storing unit, wherein the display controller controls the display unit to display the extracted icon.

According to another aspect of the present invention, there is provided an information processing apparatus comprising: a first obtaining unit which obtains schedule information associating a plurality of dates with a plurality of icons; a second obtaining unit which obtains a plurality of data files, each including date information; and a controller which associates the plurality of data files with the plurality of icons based on the date information and the schedule information.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 3 is a diagram schematically showing an event icon data base according to an exemplary embodiment of the present invention;

DETAILED DESCRIPTION

Figure 1:
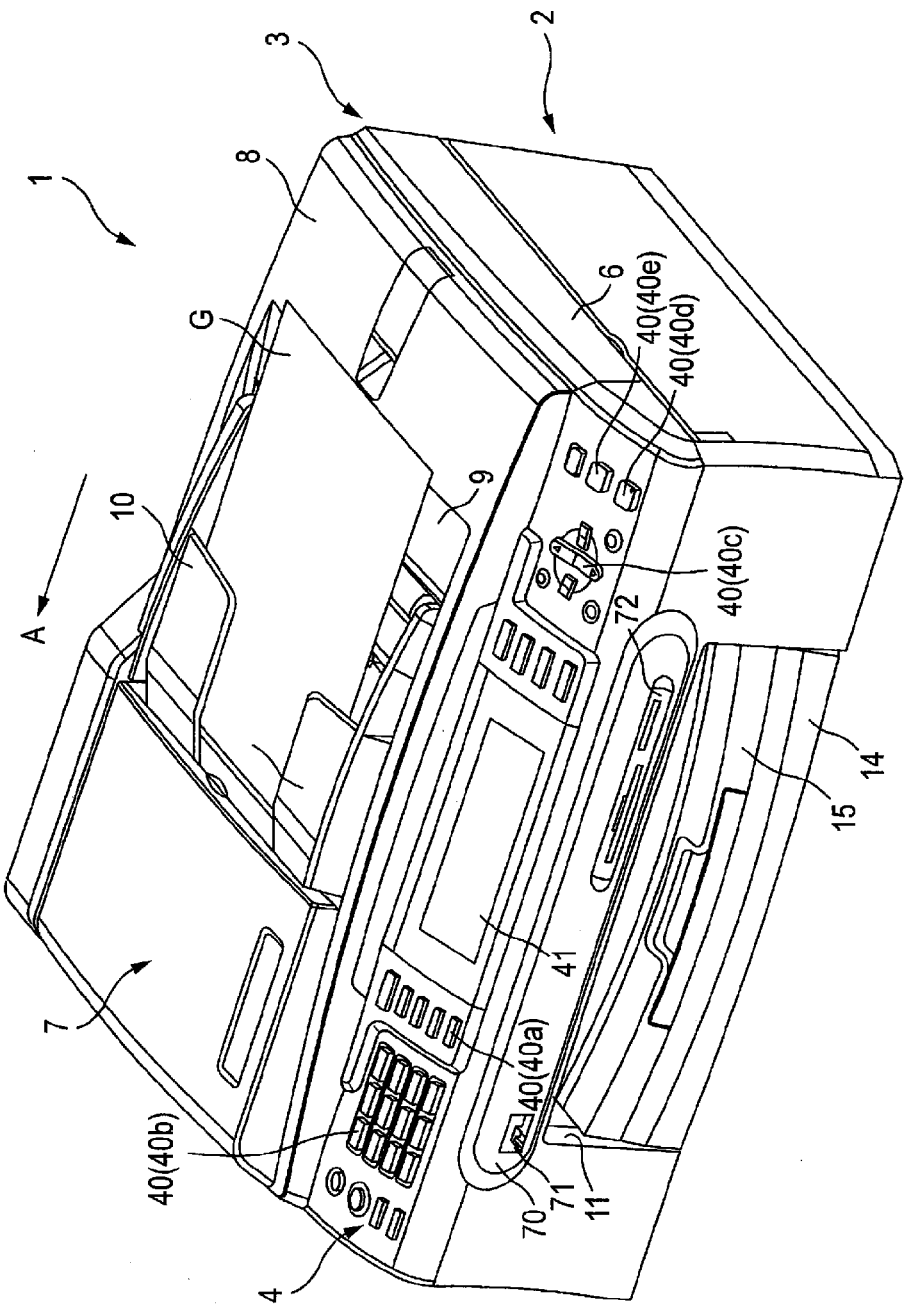
FIG. 1 is an external perspective view of a multi-function device according to an exemplary embodiment of the present invention.

Exemplary embodiments of the present invention will now be discussed with reference to the accompanying drawings. FIG. 1 is a perspective view showing an external configuration of a multi-function device according to an exemplary embodiment of the present invention which can display a screen that makes it easy to find a desired image among a large number of images on a display. As shown in FIG. 1, a multi-function device (MFD) 1 includes a printer 2 in a lower portion, a scanner 3 in an upper portion, and an operation panel 4 on a front face side of the scanner 3. The multi-function device 1 has a scanner function, a copy function, and a facsimile function.

Additionally, the multi-function device 1 has a function for connecting with an external device such as a USB memory, a digital camera, and personal computer, and recording data, which is received from the external device, on a recording sheet and a function for displaying data received from the external device on a liquid crystal display (LCD) 41 on the operation panel 4.

The scanner 3 includes a document reading base 6 that functions as a flatbed scanner (FBS), and a document cover 8 for the document reading base 6. The document cover 8 has an automatic document feeder (ADF) 7. The document reading base 6 includes a platen glass on an upper surface thereof, an image reading unit (not shown) installed therein. The scanner 3 configured as above reads images of documents by using the FBS or ADF.

The ADF 7 conveys a document G from a document tray 9 to a document discharging tray 10 through a document conveyance path. In a conveyance process of document G by the ADF 7, the document G passes through a reading surface of the document reading base 6 and an image of the document G is read by the image reading unit disposed below the reading surface. The image reading process using the ADF 7 is performed in a state that the document cover 8 is closed with respect to the document reading base 6.

The printer 2 records an image on a recording sheet based on image data read by the scanner 3 or image data inputted from outside. The printer 2 is a so-called inkjet type image recording apparatus (inkjet recording apparatus). The inkjet type is an example of image recording type of the printer 2. As a matter of course, various image recording method such as the electrophotographic method and thermal transfer method can also be employed as the image recording method of the printer 2.

The multi-function device 1 includes an opening 11 on a front side thereof, specifically, on a front side of the printer 2. The opening 11 can contain a sheet feed tray 14 and a sheet discharging tray 15 above the sheet feed tray 14 therein.

The multi-function device 1 includes an operation panel 4 disposed on front side thereof. The operation panel 4 is for operating the printer 2 and the scanner 3, and includes various operation keys 40 (40a, 40b, 40c, 40d, and 40e) and the LCD 41.

Specifically, the operation keys 40 includes a menu screen key 40a for making the multi-function device 1 display a menu screen (see FIG. 4, etc.) on the LCD 41, a numeric keypad 40b for inputting numerals and symbols, etc, a direction key 40c for commanding movement of a cursor displayed on the LCD 41, a select key 40d for commanding selection of information pointed by the cursor and a end key 40e for commanding the end of the menu screen.

The LCD 41 is formed into a rectangular shape being long in the arrow A direction (width direction) so as to have an aspect ratio of 3 to 8 in the case where the width direction is set to be lateral. In detail, two LCDs which are in rectangular shapes with an aspect ratio of 3 to 4 and independent from each other are made adjacent to each other in the arrow A direction and integrated. In the illustration of the drawing, this scale is ignored.

When a predetermined command is inputted into the multi-function device 1, operations of the multi-function device 1 is controlled by a controller 20 (see FIG. 2) based on the inputted information. It is noted that the multi-function device 1 is configured to be operable based on commands transmitted from a computer via a printer driver or a scanner driver, etc., as well as commands inputted from the operation panel 4.

The multi-function device 1 includes a connecting panel 70 provided at a position below the operation panel 4 and above the opening 11. The connecting panel 70 includes a USB terminal on the left end thereof. The USB terminal 71 is a connector terminal which connects an external device and the multi-function device 1 so as to allow communication with each other by USB connection.

The connecting panel 70 includes a slot portion 72 on the right end thereof. The slot portion 72 includes a plurality of card slots in which portable media cards (card type memories) (not shown) can be loaded. In other words, the slot portion 72 removably receives a portable media cards. When a media card is loaded in a card slot of the slot portion 72 and image data is readout by the controller 20 described later from the loaded media card, the readout image data and information on the image data are displayed on the LCD 41 by the controller 20 (see FIG. 2). Optionally, a selected image is recorded on a recording sheet in the printer 2.

Figure 2:
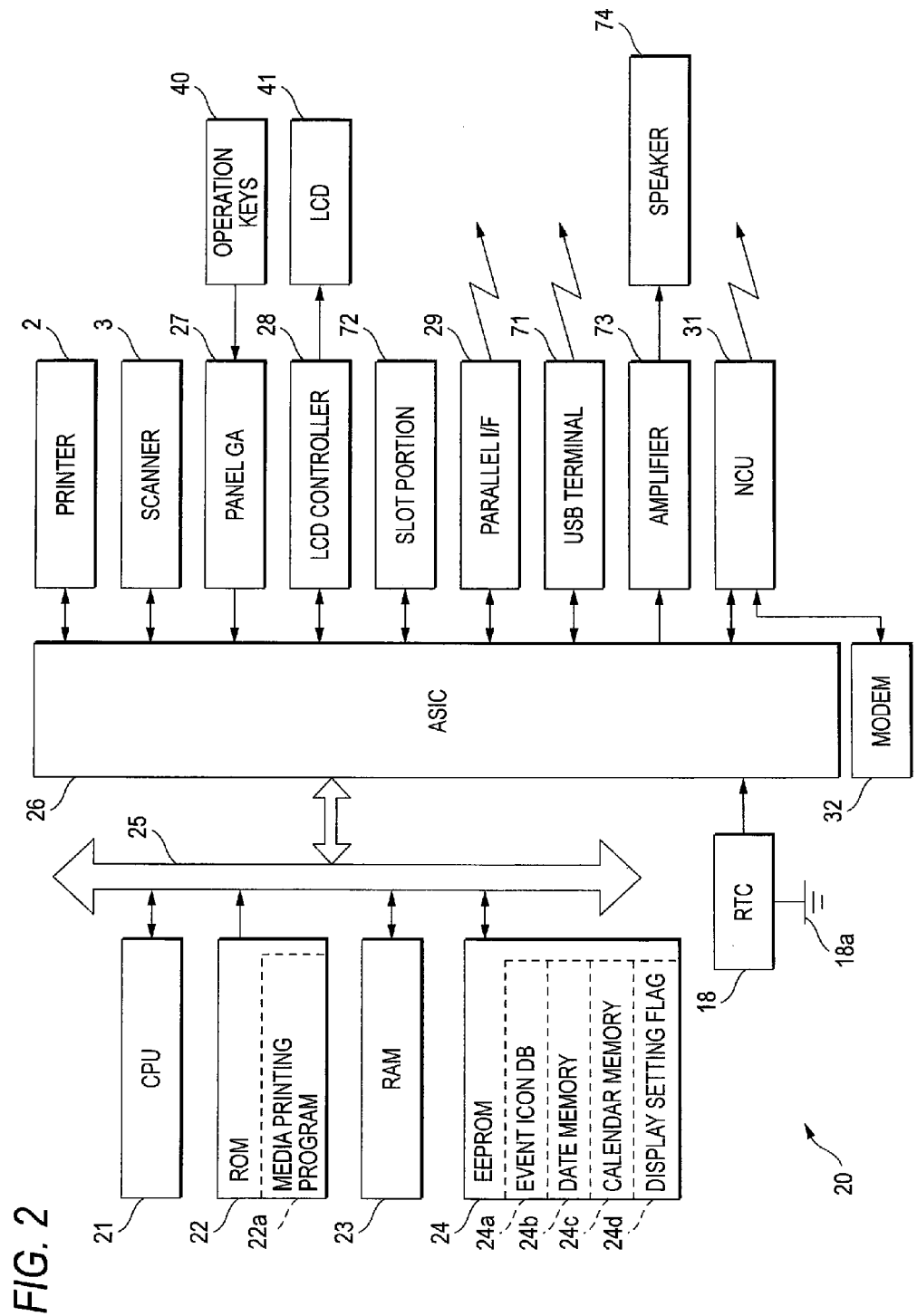
FIG. 2 is a block diagram showing electrical configuration of the multi-function device according to an exemplary embodiment of the present invention.

A general configuration of the controller 20 which controls operations of the multi-function device 1 will be described with reference to FIG. 2. FIG. 2 is a block diagram showing a general configuration of the controller 20 of the multi-function device 1 according to an exemplary embodiment of the present invention. The controller 20 totally controls operations of the multi-function device 1 including the printer 2, the scanner 3, and the operation panel 4.

The controller 20 is configured as a microcomputer including a Central Processing Unit (CPU) 21, a Read Only Memory (ROM) 22, a Random Access Memory (RAM) 23, an Electrically Erasable and Programmable ROM (EEPROM) 24, and is connected to an Application Specific Integrated Circuit (ASIC) 26 via a bus 25.

The CPU 21 totally controls the multi-function device 1, and operates according to programs stored in the ROM 22. The ROM 22 stores programs for controlling various operations of the multi-function device 1. For example, a media printing program 22a is stored as a program for executing media printing processing shown in FIG. 4 through FIG. 10. The RAM 23 is used as a storage area or a working area on which the CPU 21 temporarily records various data to be used for executing the programs.

The EEPROM 24 includes an event icon database 24a (hereinafter, referred to as "event icon DB 24a"), a designated date memory 24b, a calendar memory 24c, a display setting memory 24d, and a check box memory 24e.

In the event icon DB 24a, shooting dates and icons indicating events held on the shooting dates are stored while being associated with each other. It is noted that shooting dates and icons stored in the event icon DB 24a according to the exemplary embodiments may be stored in a portable media cards to be loaded in a card slot and obtained therefrom. Herein, by referring to FIG. 3, this event icon DB 24a will be described in more detail.

FIG. 3 is a table schematically showing information stored in the event icon DB 24a. As shown in FIG. 3, in the event icon DB 24a, shooting dates are stored in date order in the leftmost column. These shooting dates are acquired from shooting dates of images contained in image files when a media card storing the image files is inserted into a card slot of the slot portion 72, and stored. The shooting dates are not limited to the shooting dates added to the images. The shooting dates stored in the leftmost column may be saving dates on which the images were saved as the files or may be any date relating to the image file.

These shooting dates are stored while being associated with event icons showing events held on the shooting dates. In the drawings, the event icons are expressed as, in order from the left side, a black circle, a black square, a black star, a note, a double circle, a white star, a white triangle, a white square, a black inverted triangle, a black triangle, a white triangle, and a white circle. Herein, the event may include any information relating to a certain date, as well as event such as a party, a travel, a work, and so on.

For example, on Oct. 3, 2006, "T" (True) indicating that this icon has been registered is stored for the event icon of the white star, and "F" (False) indicating that these icons have not been registered is stored for other icons.

Similarly, on Oct. 12, 2006, for the event icons of the black circle, the note, and the white triangle, "T" (True) indicating that these icons have been registered are stored, and for other icons, "F" (False) indicating that these icons have not been registered is stored.

In the date memory 24b, predetermined date information composed by assigning a designated year to a variable Y, a designated month to a variable M, and a designated day to a variable D is stored. In the calendar memory 24c, calendar information from which a list of year names (a list of year names such as 2000, 2001, and 2002, etc.), a list of month names (a list of month names such as January, February, and March, etc.), and information from which a month-based calendar can be created are stored.

Figure 11A:
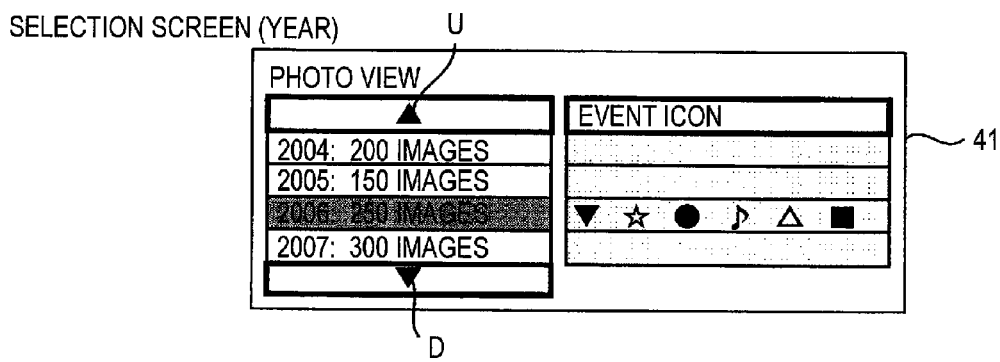
FIGS. 11A to 11C are diagrams showing display examples according to an exemplary embodiment of the present invention.
Figure 11B:
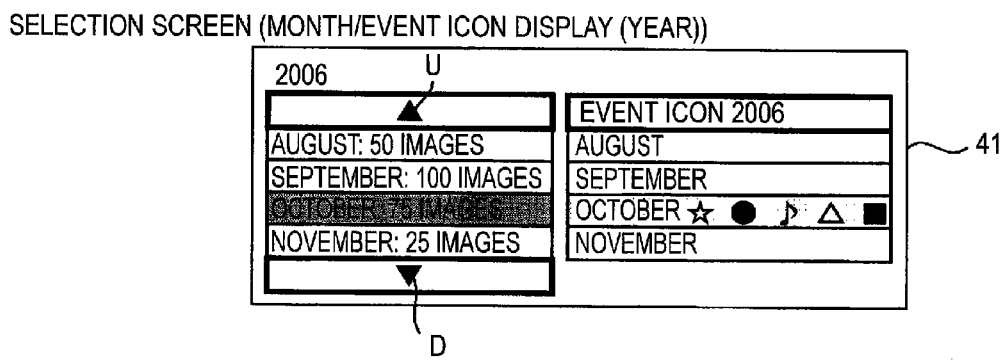
Figure 11C:
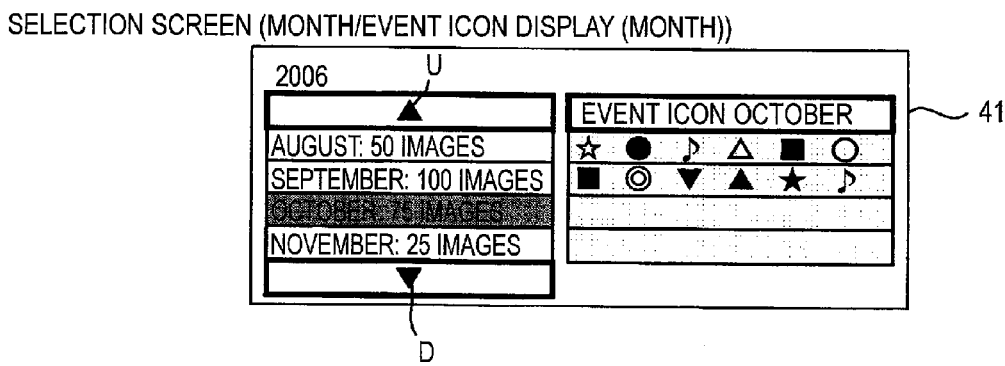

A display setting flag 24d indicates which is to be displayed, "selection screen (month/event icon display (year))" shown in FIG. 11B or "selection screen (month/event icon display (month))" shown in FIG. 11C, when displaying "selection screen (month)" described later. When the display setting flag 24d is "ON", the "selection screen (month/event icon display (year))" shown in FIG. 11B is displayed. Contrarily, when the flag is "OFF," the "selection screen (month/event icon display (month))" shown in FIG. 11C is displayed. ON and OFF of this flag can be set by a user.

In accordance with commands from the CPU 21, the ASIC 26 performs operation control of the printer 2, the scanner 3, the operation panel 4, and the slot portion 72 (for example, controls the operations of a motor and an inkjet recording head for driving the printer 2, a motor and an image reading unit for driving the ADF 7 of the scanner 3, etc.). The configuration of the printer 2, the scanner 3, and the slot portion 72 are known, so that detailed description thereof is omitted.

To the ASIC 26, a panel gate array 27 (panel GA 27) which controls the operation keys 40 for inputting a desired command into the multi-function device 1, an LCD controller 28 which controls the display screen on the LCD 41, a parallel interface 29 (parallel I/F 29) and a USB terminal 71 for transmitting and receiving data to and from a computer via a parallel cable or a USB cable, a speaker 74 via an amplifier 7, and a Real Time Clock (RTC) 18 as a chip exclusive for a clock are connected. A battery 18a is connected to the RTC 18 so that the RTC works even during turning-off of the power supply.

Further, to the ASIC 26, a Network Control Unit (NCU) 31 is connected, and to the NCU, a modem 32 is connected. The NCU 31 is for line control, and is connected to a telephone line. The NCU 31 receives a call signal and various signals transmitted from a telephone switchboard. The NCU 31 transmits dial signals when calling in response to an operation on the operation keys 40, and when the telephone line is closed, makes data communications such as transmission and receiving of analog voice signals.

The modem 32 modulates and demodulates facsimile data and e-mail data. The modem 32 transmits and receives various procedure signals for transmission control. The facsimile data is transmitted and received along facsimile procedures by the NCU 31 and the modem 32.

Figure 4:
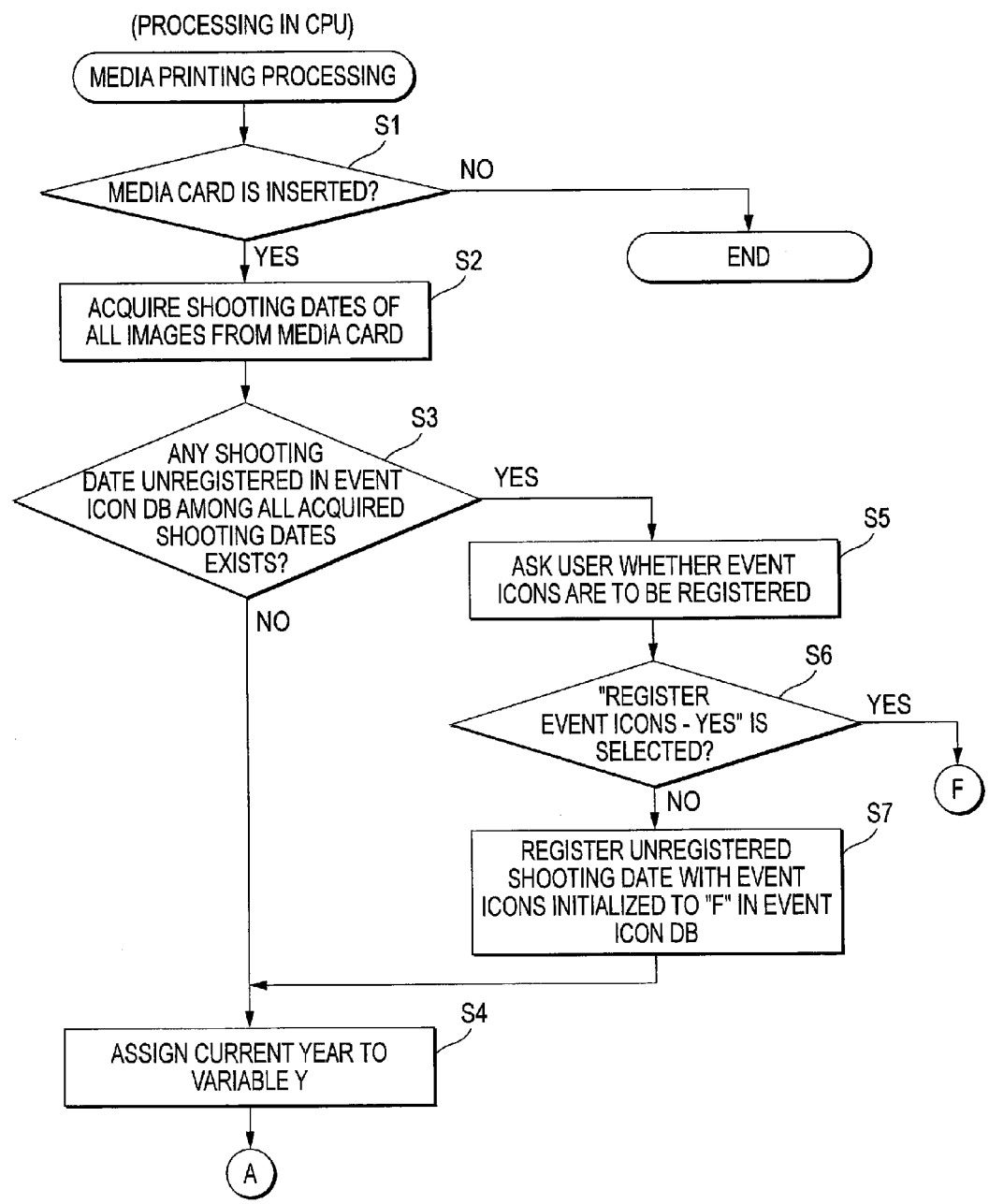
FIG. 4 is a part of a flowchart of media printing processing according to an exemplary embodiment of the present invention.

Next, the media printing processing according to an exemplary embodiment will be described with reference to FIG. 4. FIG. 4 is a flowchart showing the media printing processing according to an exemplary embodiment of the present invention. This media printing processing is for printing a desired image among images stored in a media card, and is executed according to a media printing program 22a by the CPU 21.

As shown in FIG. 4, in this processing, it is determined whether a media card has been inserted in a card slot of the slot portion 72 (S1), and when a media card is inserted (S1: Yes), shooting dates added to each of all images stored in the media card are acquired (S2). When no media card is inserted (S1: No), this processing ends.

Next, it is determined whether any shooting date exists, which has not been registered (unregistered) in the event icon DB 24a, among the acquired shooting dates (S3). When no unregistered shooting date exists (S3: No), the current year is acquired from the RTC 18 and assigned to the variable Y of the date memory 24b (S4), and the processing proceeds to processing starting from S8 shown in FIG. 5.

On the other hand, when an unregistered shooting date exists (S3: Yes), it is asked to a user whether event icons are to be registered (S5). In more detail, for example, a screen "Register event icons? Yes/No" is displayed on the LCD 41. Then, when "register event icons—Yes" is selected by operating the direction key 40c or the select key 40d (S6: Yes), the processing proceeds to processing starting from S71 shown in FIG. 10 in order to register event icons for the unregistered shooting date. Thus, when an unregistered shooting date is included in the event icon DB 24a, a user is asked to register event icons for the unregistered shooting date, so that registration of event icons into the event icon DB 24a can be promoted. Processing from S71 shown in FIG. 10 will be described later.

On the other hand, in the operation of S6, when "Register event icons—No" is selected (S6: No), the unregistered shooting date with event icons initialized to "F" is registered in the event icon DB 24a (S7), and in the same manner as described above, the processing proceeds to the processing of S4, and proceeds to the processing starting from S8 of FIG. 5. By this processing as shown in FIG. 4, a shooting date which had not been registered in the event icon DB 24a can be registered.

Figure 5:
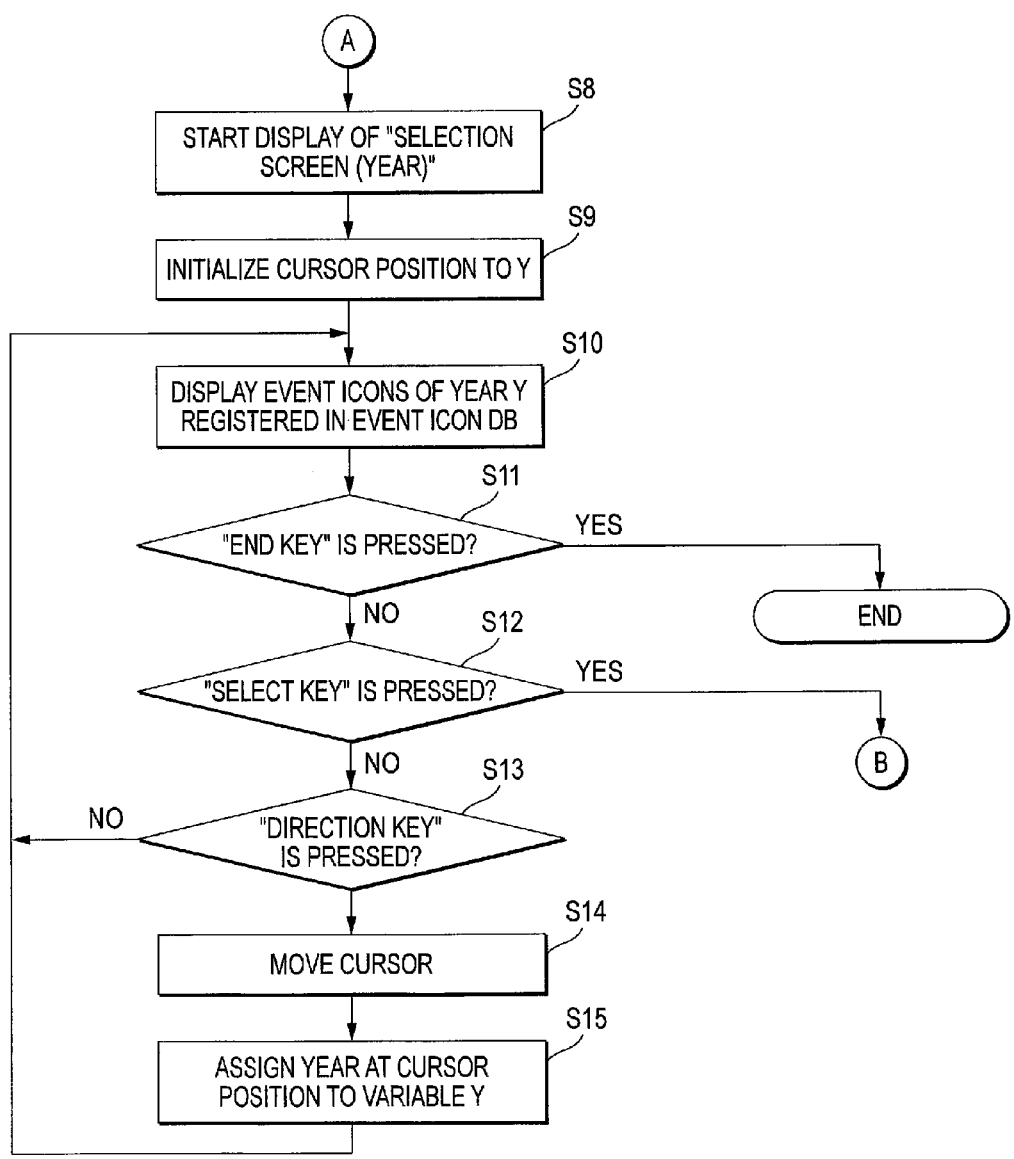
FIG. 5 is a part of the flowchart of media printing processing according to an exemplary embodiment of the present invention.

FIG. 5 is a flowchart showing processing starting from S8 to be subsequently executed after the processing of S4 of FIG. 4. In the operation of S4 of FIG. 4, by assigning the current year to the variable Y of the date memory 24b, a display of "selection screen (year)" is started (S8).

Herein, a screen example of the "selection screen (year)" displayed on the LCD 41 will be described with reference to FIG. 11A. FIG. 11A is a diagram showing a screen example of the "selection screen (year)." This "selection screen (year)" is a screen, which shows each year name and event icons associated with respective one of year names in the same straight line by extracting, on a year basis, event icons which are associated with shooting dates included in the corresponding year from the event icon DB 24a. In other words, year names is displayed in a height direction in a time order and event icons associated with respective one of year names are displayed at position adjacent to corresponding year names in a direction intersecting with the height direction.

As shown in FIG. 11A, the "selection screen (year)" is displayed on the LCD 41, and on the left side in the FIG. 11A, year names (for example, 2004, 2005, 2006, and 2007) are displayed and arranged in a row in the height direction (time axis) of the LCD 41. An upward scrolling arrow U and a downward scrolling arrow D are displayed so as to sandwich the row of the year names. When the cursor is moved to the upward scroll arrow U and the select key 40d is pressed, the year names move out of the screen in order from 2004, and from the lower side, the year names are displayed in order from 2008. On the contrary, when the cursor is moved to the downward scrolling arrow D and the select key 40d is pressed, the year names move out from the screen in order from 2007, and from the upper side, the year names are displayed in order from 2003. Since the year names are displayed by the above manner, a long period can be displayed even with the display area of the small LCD 41 mounted on the multi-function device 1.

Next to the row of the year names, total numbers of images, the shooting dates of which are included in the respective years are displayed while being associated with the respective years. With this display, a user can grasp the total numbers of images of the respective years at a glance.

Further, when the cursor position is moved to a year name in the displayed year name row, event icons which are associated with shooting dates in the year name indicated by the cursor position are extracted from the event icon DB 24a, and arranged in the same straight line in the width direction of the LCD 41 while being associated with the year name.

For example, when the cursor position is moved to the year 2006, event icons which are associated with shooting dates included in the year 2006 are extracted from the event icon DB 24a, and at least a part (black inverted triangle, white star, black circle, note, white triangle, and black square) of the extracted event icons is arranged and displayed in the same straight line as "year 2006" in the width direction of the LCD 41. By moving the cursor position to another year name, event icons which are associated with shooting dates included in the selected year name are arranged and displayed in the same straight line as the selected year name.

With this display, each event icon can express a large number of images shot for the same purpose. Therefore, even with the display area of the small LCD 41 mounted on the multi-function device 1, information about the large number of images can be displayed. Additionally, a year name and event icons associated with the year name are arranged and displayed in the same line in the width direction of the LCD 41. Therefore, each year name and event icons can be easily associated with each other at a glance.

Returning to FIG. 5, in the operation of S8, when the display of the "selection screen (year)" is started (S8), year names and total numbers of images of the year names are displayed, a cursor is positioned at year Y, and event icons of year Y registered in the event icon DB 24a are extracted and displayed (S9, S10). That is, among the plurality of year names, at the beginning, only event icons of Year, which is assigned at operation S4, are displayed.

Then, it is determined whether the end key 40e has been pressed (S11), and when the end key has not pressed (S11: No), it is determined whether the select key 40d has been pressed (S12), and when the select key is not pressed (S12: No), it is determined whether the direction key 40c has been pressed (S13), and when the direction key 40c is pressed (S13: Yes), the cursor is moved according to the command of the direction key (S14), the year at the cursor position is assigned to the variable Y of the date memory 24b (S15), and the processing starting from S10 is repeated. Thereby, icons of the year that a user desires are displayed.

At the operation of S11, when the end key 40e is pressed (S11: Yes), this processing ends. At the operation of S13, when the direction key 40c is not pressed (S13: No), the operations of S14 and S15 are skipped and the processing starting from S10 is repeated.

When the select key 40d is pressed at operation S12 (S12: Yes), it is regarded that a display screen about a month basis of Year Y, which is set when the select key 40d is pressed, is required and the processing proceeds to processing of S16 of FIG. 6.

Figure 6:
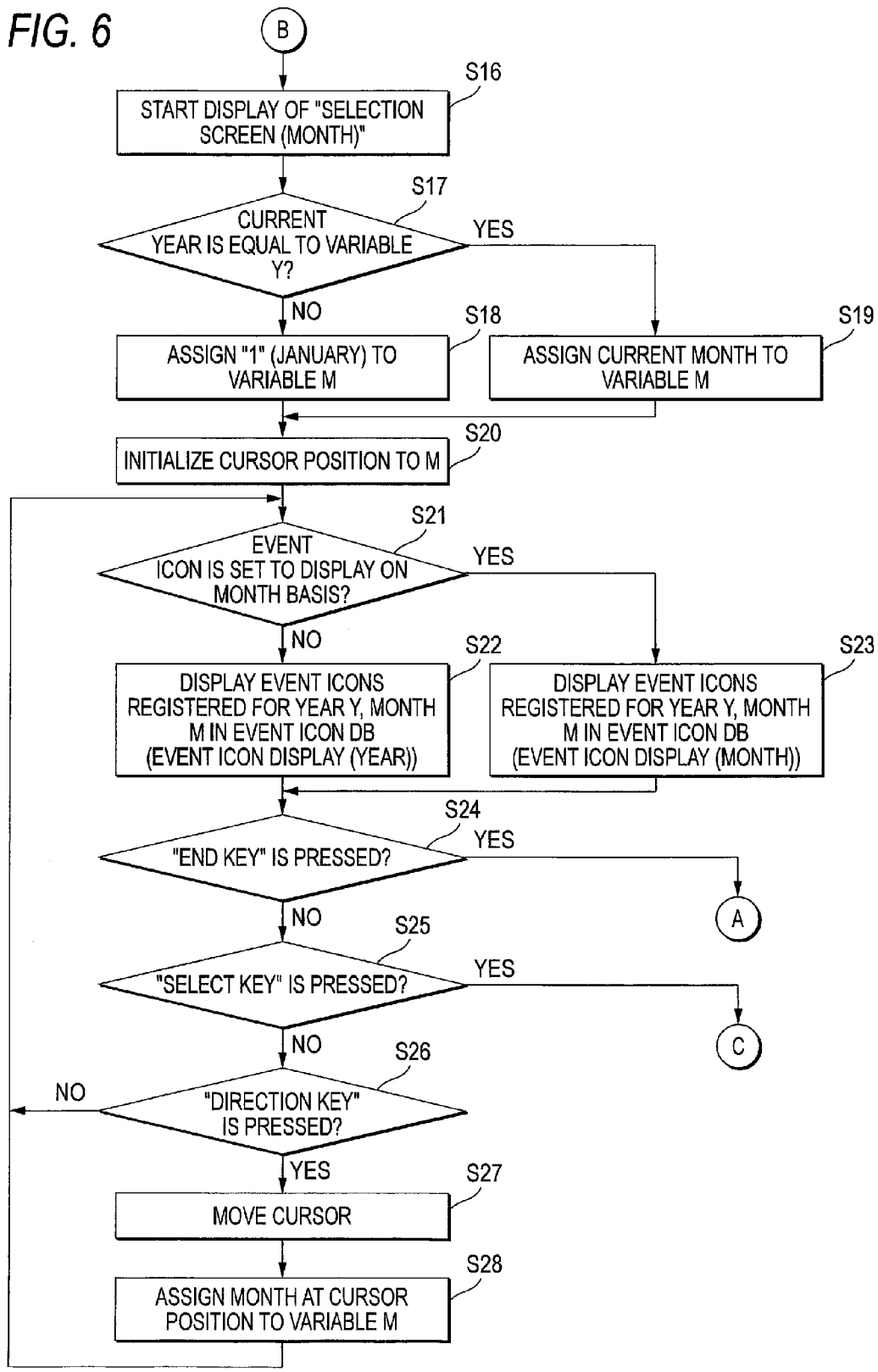
FIG. 6 is a part of the flowchart of media printing processing according to an exemplary embodiment of the present invention.

FIG. 6 is a flowchart showing processing to be subsequently executed when the select key 40d is pressed at the operation S12 of FIG. 5 (S12: Yes). In this case, first, display of "selection screen (month)" is started (S16).

Herein, with reference to FIG. 11B and FIG. 11C, a display example of the "selection screen (month)" will be described. This "selection screen (month)" is a screen displaying, on a month basis, a year selected at the previously displayed "selection screen (year)". The "selection screen (month)" can be selected from two kinds of screen: "selection screen (month/event icon display (year))" shown in FIG. 11B; and "selection screen (month/event icon display (month))" shown in FIG. 11C. Which of the two kinds of display screens is to be displayed is set according to the display setting flag 24d.

In both the "selection screen (month/event icon display (year)" shown in FIG. 11B and the "selection screen (month/event icon display (month))" shown in FIG. 11C, on the left side in the figures, month names (for example, August, September, October, and November) are arranged and displayed in a row in the height direction (time axis) of the LCD 41.

The upward scrolling arrow U and the downward scrolling arrow D are displayed so as to sandwich the row of the month names. When the cursor is moved to the upward scrolling arrow U and the select key 40d is pressed, the month names move out of the screen in order from August, and the month names are displayed in order from December from the lower side. On the contrary, when the cursor is moved to the downward scrolling arrow D and the select key 40d is pressed, the month names move out of the screen in order from November and the month names are displayed in order from July from the upper side.

Next to the row of the month names, total numbers of images, shooting dates of which are included in the respective months, are displayed while being associated with the respective month names. With this display, a user can grasp the total numbers of images in the respective months at a glance.

In the "selection screen (month/event icon display (year))" shown in FIG. 11B, when the cursor position is moved to a month name in the month name row displayed, event icons which are associated with shooting dates included in the month name indicated by the cursor position, are arranged and displayed in the same straight line in the width direction of the LCD 41 while being associated with the month name.

For example, when the cursor position is moved to October, at least a part (white star, black circle, note, white triangle, and black square) of event icons which are associated with shooting dates included in October, are arranged and displayed in the same straight line as the selected month name "October" in the width direction of the LCD 41.

By moving the cursor position to another month name, event icons which are associated with shooting dates included in the selected month name, are arranged and displayed in the same straight line as the selected month name, similarly.

The display format of a month name and event icons which are associated with shooting dates included in a period of the month name, is the same as the display format of the year name and event icons which are associated with shooting dates included in the period of the year name. Additionally, the same event icons as those displayed while being associated with the selected year name are displayed while being associated with any of the months of the selected year. Therefore, selection of year and selection of month can be made easily and operation can be made easier.

On the other hand, in the "selection screen (month/event icon display (month))," shown in FIG. 11C, only event icons which are associated with shooting dates included in a selected month in the month name row, are displayed next to the total number of images of each month on the LCD 41, regardless of the same straight line.

For example, event icons (white star, black circle, note, white triangle, black square, white circle) are displayed in the same straight line as August, and in the same straight line as September, (black square, double circle, black inverted triangle, black triangle, black start, and note) are displayed. Shooting dates of those icons are included in October.

With this display, a larger number of event icons included in a designated month in a month name row can be displayed than those of the "selection screen (month/event icon display (year))" shown in FIG. 11B. Therefore, it is not always necessary to display all event icons included in the designated month, so that when it is desired to show event icons of a plurality of months of the months constituting one year, the former display (see FIG. 11B) is selected, and when it is desired to show all of event icons in any one month of one year, the latter display (see FIG. 11C) is selected, whereby display suitable for a user's purpose of use can be performed.

Returning to FIG. 6, in the operation of S16, when the display of the "selection screen (month)" is started (S16), it is determined whether the current year and the variable Y in the date memory 24b are equal to each other (S17). When they are not equal to each other (S17: No), "1" (January) is assigned to the variable M (S18). Contrarily, when they are equal to each other (S17: Yes), the current month is assigned to the variable M (S19). Then, the cursor position is set (initialized) to the month M (S20).

Next, it is determined whether the display setting of event icons is on a month basis, based on the display setting flag 24d (S21). When the display setting flag is not on a month basis (S21: No), the event icons registered for the Year Y and Month M in the event icon DB 24a are displayed (S22). In more detail, the "selection screen (month/event icon display (year)" shown in FIG. 11B is displayed.

On the other hand, in the determination of S21, when the display setting is on a month basis (S21: Yes), event icons registered for the Year Y, Month M in the event icon DB are displayed (S23). In more detail, the "selection screen (month/event icon display (month))" shown in FIG. 11C is displayed.

Then, it is determined whether the end key 40e has been pressed (S24), and when the end key is not pressed (S24: No), it is determined whether the select key 40d has been pressed (S25), and when the select key is not pressed (S25: No), it is determined whether the direction key 40c has been pressed (S26). When the direction key 40c is pressed (S26: Yes), according to a command of this direction key, the cursor is moved (S27), the month at the cursor position is assigned to the variable M of the date memory 24b (S28), and the processing starting from S21 is repeated. Thus, icons of the month that a user desires are displayed.

At operation S24, when the end key 40e is pressed (S24: Yes), the processing proceeds to the processing starting from S8 of FIG. 5 described above. In the processing of S26, when the direction key 40c is not pressed (S26: No), the operations of S27 and S28 are skipped and the processing starting from S21 is repeated.

On the other hand, when the select key 40d is pressed (S25: Yes), it is regarded that a display screen about a day basis ("selection screen (day)") of Year Y, Month M, which is set when the select key 40d is pressed, is required and the processing proceeds to S29 of FIG. 7.

Figure 7:
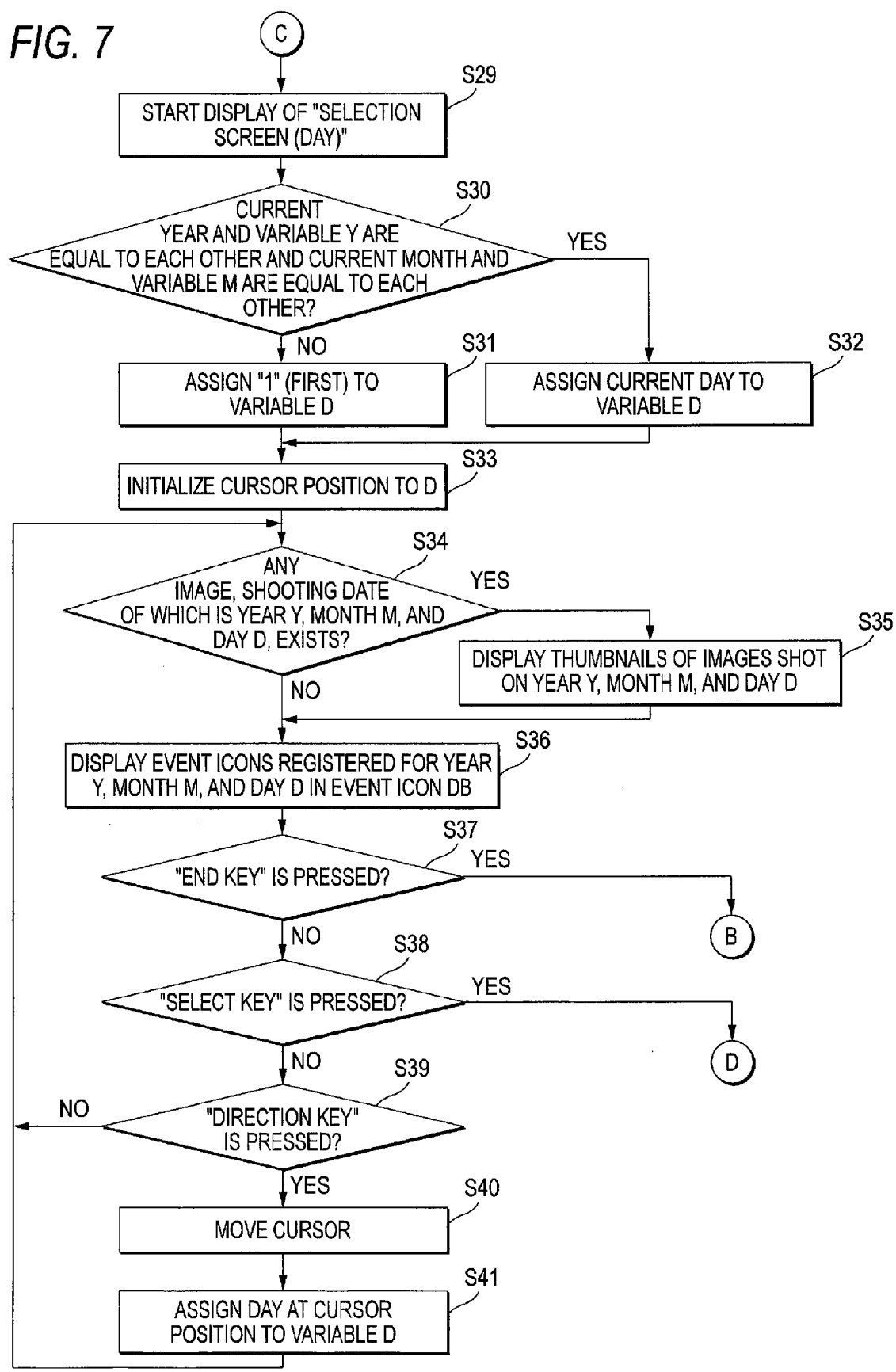
FIG. 7 is a part of the flowchart of media printing processing according to an exemplary embodiment of the present invention.

FIG. 7 is a flowchart showing processing to be subsequently executed when the select key 40d is pressed at the operation of S25 of FIG. 6 (S25: Yes). In this case, first, the display of the "selection screen (day)" is started (S16).

Figure 12A:
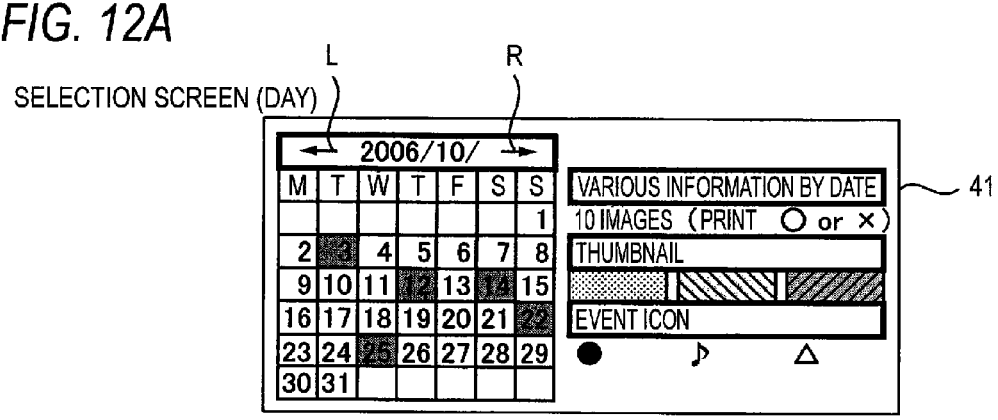
FIGS. 12A to 12C are diagrams showing display examples according to an exemplary embodiment of the present invention.

Herein, with reference to FIG. 12A, a display example of the "selection screen (day)" will be described. FIG. 12A is a diagram showing a display example of the "selection screen (day)."

As shown in FIG. 12A, the "selection screen (day)" is displayed on the LCD 41, and on the left side of the diagram, a month-based calendar K of a designated year is displayed. On an upper portion of the calendar K, year and month names are displayed (2006/10/), and on both sides of the year name and month name, leftward scrolling arrow L and rightward scrolling arrow R are displayed. When the cursor is moved to the leftward scrolling arrow L and the select key 40d is pressed, the calendar K of 2006 is displayed in order from November, 2006, and on the contrary, when the cursor is moved to the rightward scrolling arrow R and the select key 40d is pressed, the calendar K of 2006 is displayed in order from September, 2006.

In the calendar, dates on which any image data exists are displayed in a manner different from that of other dates. For example, Oct. 3, 12, 14, 22, and 25, 2006 are displayed with highlight, and dates on which any image data exists can be grasped at a glance.

On the right side of the calendar K, various information on a date, to which the cursor position is set among the dates included in the calendar K, are displayed. For example, a total number of images of the selected date, thumbnail images, and event icons which are associated with the selected date, are displayed. Therefore, among all dates in one month, various information associated with shooting dates shown by the respective date names can be confirmed by day basis. It is noted that event icons may be overlapped with displayed dates.

Referring to FIG. 7, at the operation S29, when the display of the "selection screen (day)" is started (S29), it is determined whether the current year and the variable Y are equal to each other and whether the current month and the variable M are equal to each other (S30). When they are not equal to each other (S30: No), "1" (first) is assigned to the variable D (S31). On the other hand, when they are equal to each other, respectively (S30: Yes), the current day is assigned to the variable D (S32). Then, the cursor position is set (initialized) to D (S33).

Next, it is determined whether an image, shooting date of which is Year Y, Month M, and Day D, exists. When such an image exists (S34: Yes), a thumbnail image of Year Y, Month M, and Day D is displayed (S35). Then, the processing proceeds to operation S36. On the other hand, if such an image does not exist (S34: No), event icons registered for Year Y, Month M, and Day D are displayed (S36). Thus, various information on Year Y, Month M, and Day D is displayed as shown in FIG. 12A.

Then, it is determined whether the end key 40e has been pressed (S37), and when the end key is not pressed (S37: No), it is determined whether the select key 40d has been pressed (S38), and when the select key is not pressed (S38: No), it is determined whether the direction key 40c has been pressed (S39). When the direction key 40c is pressed (S39: Yes), according to a command of the direction key, the cursor is moved (S40), the day at the cursor position is assigned to the variable D of the date memory 24b (S41), and the processing starting from S34 is repeated.

At the operation S37, when the end key 40e is pressed (S37: Yes), the processing proceeds to the processing starting from S16 of FIG. 6 described above. In the processing of S39, when the direction key 40c is not pressed (S39: No), the operations of S40 and S41 are skipped and the processing starting from S34 is repeated.

On the other hand, when the select key 40d is pressed (S37: Yes), it is regarded that printing of an image, shooting date of which is Year Y, Month M, and Day D when the select key 40d was pressed, is requested, and the processing proceeds to processing starting from S42 shown in FIG. 8.

Figure 8:
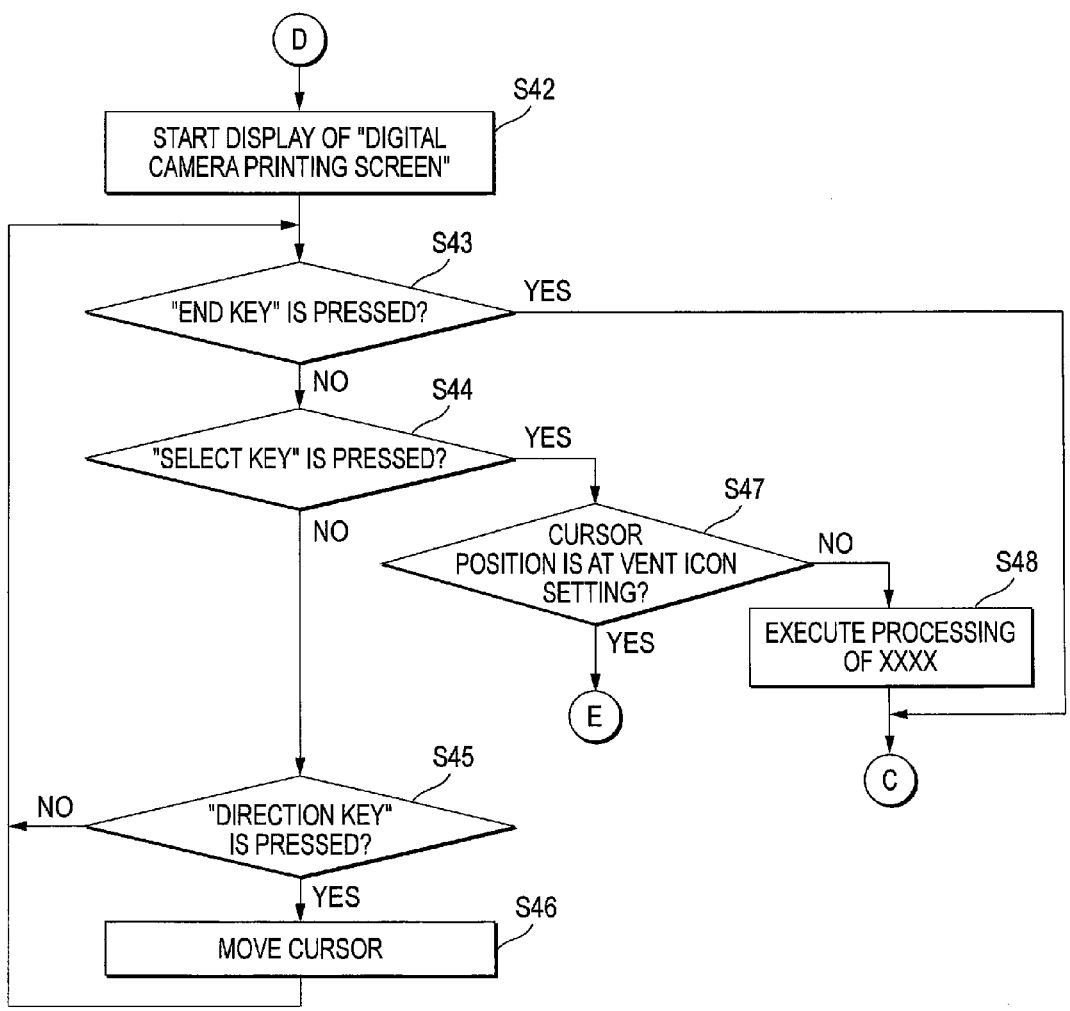
FIG. 8 is a part of the flowchart of media printing processing according to an exemplary embodiment of the present invention.

FIG. 8 is a flowchart showing processing to be subsequently executed when the select key 40e is pressed at the operation S38 of FIG. 7 (S38: Yes). In this case, first, display of the "digital camera printing screen" is started (S42).

Figure 12B:
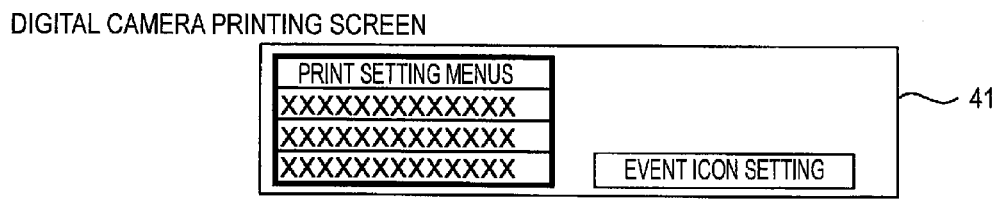

Herein, with reference to FIG. 12B, a display example of the "digital camera printing screen" will be described. FIG. 12B is a diagram showing a display example of the "digital camera printing screen."

As shown in FIG. 12B, the "digital camera printing screen" is displayed on the LCD 41. At a left side of FIG. 12B, print setting menus "XXXXXX" for printing images are displayed in a plurality of lines. The print setting menus includes a print start menu. When the cursor is moved to any of the print setting menus and the select key 40d is pressed, the selected print setting menu is executed. Particularly, when the cursor is moved to the print start menu, images, shooting date of which is Year Y, Month M, and Day D are printed.

At a right of the print setting menus, a column of "event icon setting" is displayed. When the cursor is moved to this "event icon setting" column and the select key 40d is pressed, an "event icon selection screen" described later is displayed.

Returning to FIG. 8, at the operation S42, when the display of the "digital camera printing screen" is started (S42), it is determined whether the end key 40e has been pressed (S43), and when the end key 40e is not pressed (S43: No), it is determined whether the select key 40d has been pressed (S45), and when the select key 40d is not pressed (S45: No), it is determined whether the direction key 40c has been pressed (S45). When the direction key 40e is pressed (S45: Yes), according to a command of the direction key, the cursor is moved (S46), and the processing starting from S43 is repeated.

At the operation S37, when the end key is pressed (S43: Yes), the processing proceeds to the processing starting from S29 of FIG. 7 described above. When the select key 40d is pressed (S44: Yes), it is determined whether the cursor position is at "event icon setting" (S47). When the cursor position is out of "event icon setting" (S47: No), "XXXXX" indicated by the cursor position of the print setting menus is executed (S48), and then the processing proceeds to the processing starting from S29 of FIG. 7 described above. On the other hand, at operation S47, when the cursor position is at "event icon setting" (S47: Yes), the processing proceeds to the processing starting from S47 of FIG. 9.

Figure 9:
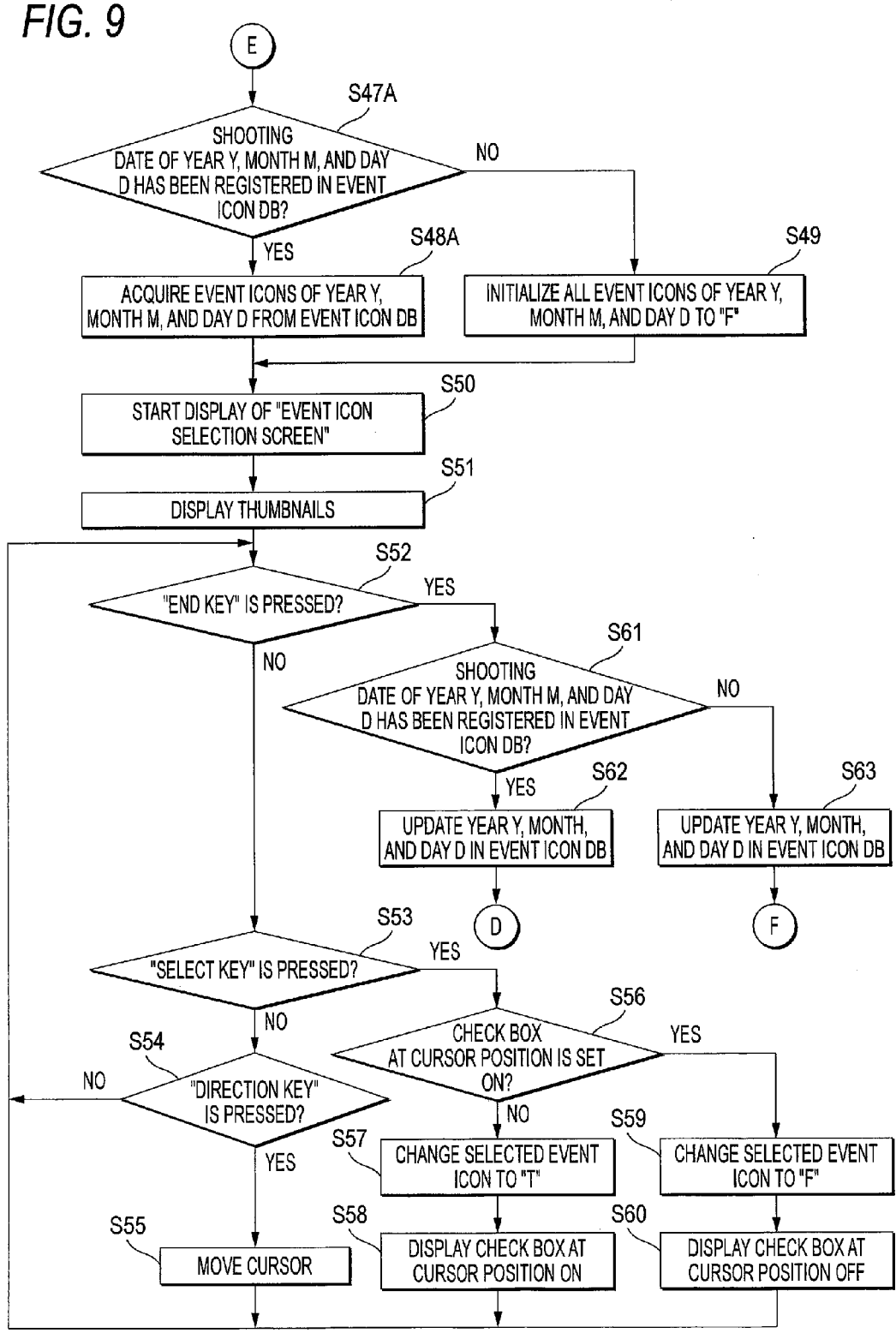
FIG. 9 is a part of the flowchart of media printing processing according to an exemplary embodiment of the present invention.

FIG. 9 is a flowchart showing processing to be subsequently executed when "event icon setting" is requested in the processing of S47 of FIG. 8 (S47: Yes). In this case, it is determined whether the shooting date of Year Y, Month M, and Day D has been registered in the event icon DB (S47A). When it is registered (S47A: Yes), event icons of Year Y, Month M, and Day D are acquired from the event icon DB (S48A). On the other hand, when it is not registered (S47A: No), all event icons of the shooting date of Year Y, Month M, and Day D are initialized to "F" (S49). Then, display of the "event icon selection screen" is started (S50).

Figure 12C:
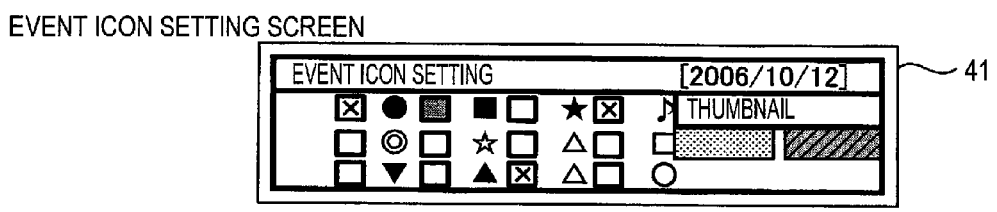

Herein, with reference to FIG. 12C, a display example of the "event icon setting screen" will be described. FIG. 12C is a diagram showing a display example of the "event icon setting screen." As shown in FIG. 12C, the "event icon setting screen" is displayed on the LCD 41, and at an upper right corner, the date of Year Y, Month M, and Day D (2006/10/12) is displayed, and under the date, thumbnail images, shooting dates of which are the date of Year Y, Month M, and Day D, are displayed, and at left of the thumbnail images, check boxes of the respective event icons are displayed.

A cursor position is moved to a check box of an event icon which is desired to register and the select key 40e is pressed to display the check box ON (refer to the cross mark in FIG. 12C), whereby the event icon can be registered.

Returning to FIG. 9, at operation of S50, when display of the "event icon setting screen" is started (S50), thumbnail images of images, shooting dates of which are the date of Year Y, Month M, and Day D, are displayed (S51).

Next, it is determined whether the end key 40e has been pressed (S52), and when the end key is not pressed (S52: No), it is determined whether the select key 40d has been pressed (S53), and when the select key 40d is not pressed (S53: No), it is determined whether the direction key 40c has been pressed (S54). When the direction key 40c is pressed (S54: Yes), according to a command of the direction key, the cursor is moved (S55), and the processing starting from S52 is repeated.

In the processing of S53, when the select key is pressed (S56: Yes), it is determined whether the check box at the cursor position is set ON (S56). When it is not set ON (S56: No), the selected event icon is changed to "T" (S57), the check box at the cursor position is displayed ON (S58) and the processing starting from S52 is repeated.

On the other hand, at operation S56, when the check box at the cursor position is set ON (S56: Yes), the selected event icon is changed to "F" (S59), the check box at the cursor position is displayed OFF (S60), and the processing starting from S52 is repeated.

In the operation of S52, when the end key is pressed (S52: Yes), it is determined whether the shooting date of Year Y, Month M, and Day D has been registered in the event icon DB (S61). When it is registered (S61: Yes), the date of Year Y, Month M, and Day D in the event icon DB is updated (S62), and the processing proceeds to the processing starting from S42 of FIG. 8 described above. On the other hand, when it is not registered (S61: No), the date of Year Y, Month M, and Day D in the event icon DB is updated (S62), and the processing proceeds to the processing starting from S71 of FIG. 10. Thus, the event icon can be registered.

Figure 10:
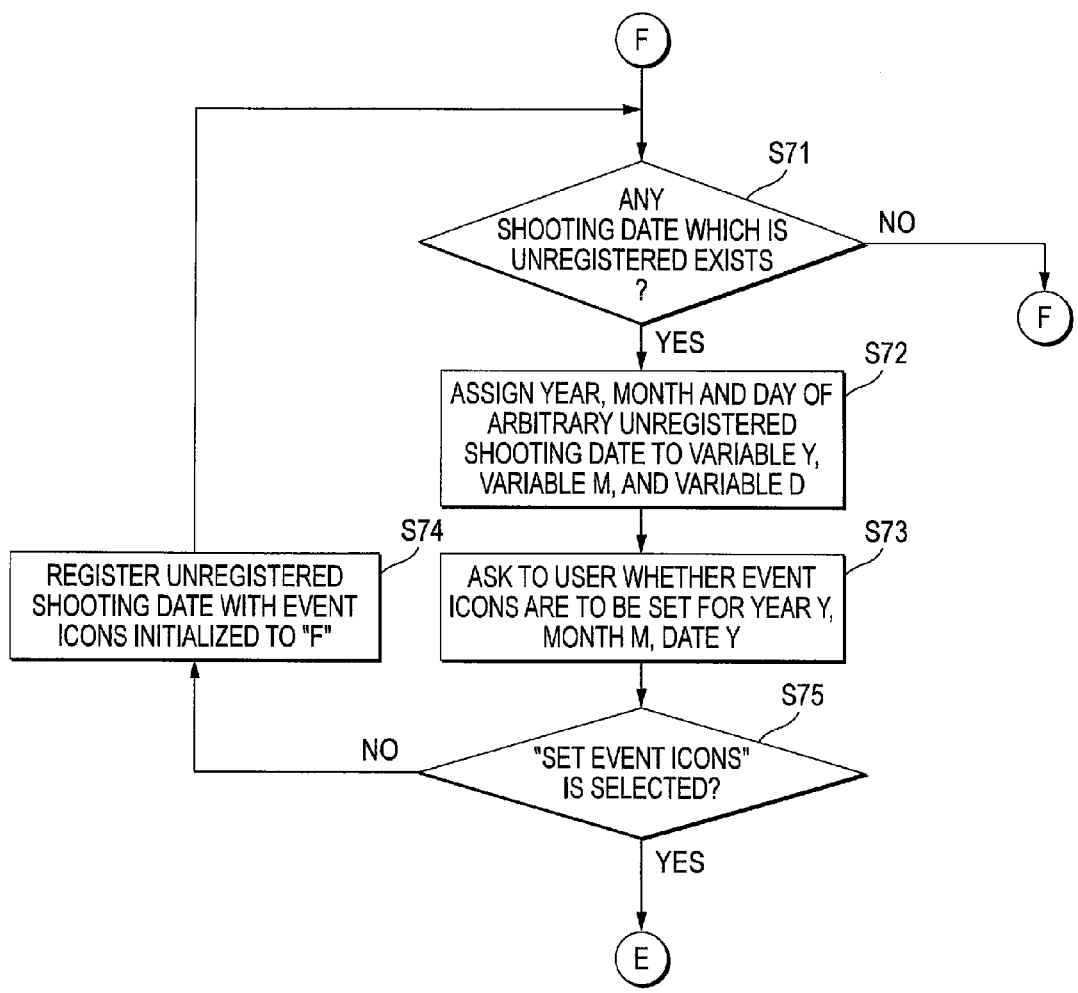
FIG. 10 is a part of the flowchart of media printing processing according to an exemplary embodiment of the present invention.

FIG. 10 is a flowchart showing processing to be subsequently executed after the operation S63 of FIG. 9. At the operation S63 of FIG. 9, when the date of Year Y, Month M, and Day D in the event icon DB is updated, it is determined whether any shooting date exists, which has not been registered (unregistered) (S71), and when no unregistered shooting date exists (S71: No), the processing proceeds to the processing starting from S8 of FIG. 5.

On the other hand, when unregistered shooting dates exists (S71: Yes), the year, the month, and the day of an arbitrary unregistered shooting date are assigned to the variable Y, the variable M, and the variable D (S72). Then, it is asked to a user whether event icons are to be set for the date of Year Y, Month M, and Day D (S73). It is determined whether a user has selected "set event icons" (S75), and when the user selects "set event icons" (S75: Yes), the processing proceeds to the processing starting from S47A of FIG. 9. On the other hand, when a user does not select "set event icons" (S75: No), the unregistered shooting date with event icons initialized to "F" is registered (S75), and the processing starting from S61 is repeated.

The present invention is not limited to exemplary embodiments described above with reference to the accompanying drawings. However, the present invention is not limited to the above-described exemplary embodiments, and can be variously altered within the scope of the spirit of the present invention.

For example, in the above exemplary embodiments, the extraction range is narrowed in a phased manner in units of years (one year) or months (one month), however, instead of the units of years (one year), the units may be of a plurality of years or a plurality of months, and instead of the units of months (one month), the units may be of a plurality of weeks or a plurality of days.

According to the above exemplary embodiments, a graphic symbol such as a circle, a triangle and a star etc. are used as an event icon. However, the present invention is not limited thereto. A small figure indicating an event, or a character string may be used as an event icon.

According to the above exemplary embodiments, an image shot on a selected day is printed. However, the present invention is not limited there to. Images, shooting date of which is included in a month or a year may be printed at the same time.

According to the above exemplary embodiments, the MFD 1 includes a printer 2. However, the present invention is not limited thereto. The inventive concept of the present invention may be applied to an information processing apparatus which does not have printer. In the information processing apparatus, the desired image may be found easily from among a large number of images even with a small display.

According to the above exemplary embodiments, the icons are stored while being associated with dates and images are stored with shot date thereof. By this configuration, images shot for an event are expressed as an icon, which is associated with a date on which the event is held. In other words, the images shot for an event are associated with an icon, which is associated with a date on which the event is held, by linking the date on which the event is held and shot date of the images.

According to the above exemplary embodiments, when shot images are displayed, since period names are displayed in a row in time axis, a long period can be displayed even with the display area of the small LCD 41 mounted on the multi-function device 1. In addition, a large number of images shot for the same purpose are collected as images relating to one event and expressed as one icon, so that information on a large number of images can be displayed even in a small display area. Further, period names and icons corresponding to the periods are displayed in a direction intersecting with a direction along which the period names are arranged, so that the periods and icons can be associated with each other by only a glance. Therefore, an effect is brought about that even in a small display area, a desired image can be found among a large number of images.

According to the above exemplary embodiments, in the same format as a format of display of a selected year name and icons, month name and icons thereof are displayed, and icons identical to those displayed by being associated with the selected year name are displayed by being associated with any of month names, so that year name and the month name are easily selected and handled.

According to the above exemplary embodiments, images shot in a period of a selected period name are extracted, so that image extraction is easy.

According to the above exemplary embodiments, selection screen is year basis or month basis. Therefore, users are familiar to them and can easily use.

According to the above exemplary embodiments, a "selection screen (month/event icon display (year))" shown in FIG. 11B or "selection screen (month/event icon display (month))" are selectively displayed, so that when it is desired to confirm icons in a plurality of periods among months, the former screen is selected, and when it is desired to confirm what icons are in any one month, the latter control is selected, whereby display suitable for the user's purpose of use is realized.

According to the above exemplary embodiments, all date names are displayed, and icons corresponding to shooting dates of the date names are displayed at positions adjacent to or overlapping all date names. Therefore, in all the dates, icons corresponding to the shooting dates of the date names can be confirmed by date.

According to the above exemplary embodiments, storing of icons showing events to be held on a shooting date that has not been registered by associating it with the shooting date is promoted.

What is claimed is:

1. A printing apparatus operating with one or more data files comprising:
   a display unit;
   a display controller which controls the display unit to display an input screen for associating a date with at least one icon, the input screen including a name of the date and a thumbnail image of at least one of the one or more data files relating to the date;
   an input unit which receives an input indicating an association between the date and at least one icon;
   an icon storing unit which stores a plurality of icons and a plurality of dates while being associated with each other based on inputs through the input unit;
   an extracting unit which extracts an icon, which is associated with dates within a time period among a plurality of first time periods, from the icon storing unit, wherein the display controller controls the display unit to display a plurality of period names corresponding to the plurality of first time periods and the extracted icon;
   a selecting unit which selects a period name from among the period names displayed on the display unit;
   a printing unit which prints at least one of the one or more data files which relates to dates within the time period corresponding to the period name selected by the selecting unit;
   an obtaining unit which obtains at least one of the one or more data files;
   an acquiring unit which acquires a date relating to the at least one data file obtained by the obtaining unit; and
   a determination unit which determines whether the icon storing unit stores the acquired date while being associated with any icons, wherein the display controller controls the display unit to display the input screen in response to the determination unit determining that the icon storing unit does not store the acquired date while being associated with any icons.

2. The printing apparatus according to claim 1,
wherein the printing unit prints at least one of the one or more data files which is made on the dates within the time period selected by the selecting unit.

3. The printing apparatus according to claim 2,
wherein each of the one or more data files includes an image file, and
wherein the printing unit prints an image file which is shot or saved on the dates within the time period selected by the selecting unit.

4. The printing apparatus according to claim 1,
wherein each of the icons indicates an event, and
wherein the icon storing unit stores each of the icons and a date on which the event indicated by the corresponding icon is held, while being associated with each other.

5. The printing apparatus according to claim 1, further comprising an interface unit which removably receives a portable storage device,
wherein at least one of the one or more data files is stored in the portable storage device.

6. The printing apparatus according to claim 1,
wherein the display controller controls the display unit to display the plurality of period names in a first direction in a time order and to display an icon, which is associated with dates within each of the first periods, adjacent to corresponding period name in a second direction intersecting with the first direction.

7. A printing apparatus comprising:
a display unit;
an icon storing unit which stores a plurality of icons and a plurality of dates while being associated with each other;
an extracting unit which extracts an icon, which is associated with dates within a time period among a plurality of first time periods, from the icon storing unit;
a display controller which controls the display unit to display a plurality of period names corresponding to the plurality of first time periods and the extracted icon;
a selecting unit which selects a period name from among the period names displayed on the display unit; and
a printing unit which prints a data file which relates to dates within the time period corresponding to the period name selected by the selecting unit,
wherein the display controller controls the display unit to display a plurality of period names corresponding to a plurality of second time periods, each comprising the plurality of first time periods,
wherein the extracting unit extracts an icon, which is associated with dates within a time period among the plurality of second time periods, from the icon storing unit, and
wherein the display controller controls the display unit to display the extracted icon.

8. The printing apparatus according to claim 5,
wherein the display controller controls the display unit to display the period names corresponding to the plurality of second time periods in a first direction in a time order and display an icon, which is associated with dates within each of the second time periods, adjacent to corresponding period name in a second direction intersecting with the first direction.

9. The printing apparatus according to claim 5,
wherein each of the first time periods corresponds to a month, and wherein each of the second time periods corresponds to a year.

10. A printing apparatus comprising:
a display unit;
an icon storing unit which stores a plurality of icons and a plurality of dates while being associated with each other;
an extracting unit which extracts an icon, which is associated with dates within a time period among a plurality of first time periods, from the icon storing unit;
a display controller which controls the display unit to display a plurality of period names corresponding to the plurality of first time periods and the extracted icon;
a selecting unit which selects a period name from among the period names displayed on the display unit; and
a printing unit which prints a data file which relates to dates within the time period corresponding to the period name selected by the selecting unit,
wherein the display controller selectively performs a first control and a second control,
wherein, in the first control, the display controller controls the display unit to display the period names corresponding to the first time periods in a first direction in a time order and to display a predetermined number of icons among icons, which are associated with dates within each of the first time periods, adjacent to corresponding period name in a second direction intersecting with the first direction, and
wherein, in the second control, the display controller controls the display unit to display the period names corresponding to the first time periods and to display all icons which are associated with dates within the time period selected by the selecting unit.

11. A printing apparatus comprising:
a display unit;
an icon storing unit which stores a plurality of icons and a plurality of dates while being associated with each other;
an extracting unit which extracts an icon, which is associated with dates within a time period among a plurality of first time periods, from the icon storing unit;
a display controller which controls the display unit to display a plurality of period names corresponding to the plurality of first time periods and the extracted icon;
a selecting unit which selects a period name from among the period names displayed on the display unit; and
a printing unit which prints a data file which relates to dates within the time period corresponding to the period name selected by the selecting unit,
wherein the display controller performs a first control and a second control,
wherein, in the first control, the display controller controls the display unit to display the periods names corresponding to the first time periods in a first direction in a time order and to display an icon, which is associated with dates within each of the first time periods, adjacent to corresponding period name in a second direction intersecting with the first direction, and
wherein, in the second control, the display controller controls the display unit to display date names corresponding to all dates within the time period selected by the selecting unit, and to display an icon which is associated with each date within the time period selected by the selecting unit.

12. The printing apparatus according to claim 11,
wherein, in the second control, the display controller controls the display unit to display the icon adjacent to, or overlapping with, the date names corresponding to all dates.

13. A printing apparatus operating with one or more data files comprising:
a display unit;
an icon storing unit which stores a plurality of icons and a plurality of dates while being associated with each other;
an extracting unit which extracts an icon, which is associated with dates within a time period among a plurality of first time periods, from the icon storing unit;
a display controller which controls the display unit to display a plurality of period names corresponding to the plurality of first time periods and the extracted icon;
a selecting unit which selects a period name from among the period names displayed on the display unit;
a printing unit which prints at least one of the one or more data files which relates to dates within the time period corresponding to the period name selected by the selecting unit,
an interface unit which removably receives a portable storage device which stores at least one of the one or more data files,
an acquiring unit which acquires a date relating to at least one of the one or more data files, in response to receipt of the portable storage device by the interface unit; and
a determination unit which determines whether the icon storing unit stores the acquired date while being associated with any of icons,
wherein the display controller controls the display unit to display an input screen for storing the acquired date while being associated with an icon if the determination unit determines that that icon storing unit does not store the acquired date while being associated with any of icons.

14. An information processing apparatus operating with one or more data files comprising:
a display unit;
a display controller which controls the display unit to display an input screen for associating a date with at least one icon, the input screen including a name of the date and a thumbnail image of at least one of the one or more data files relating to the date;
an input unit which receives an input indicating an association between the date and at least one icon;
an icon storing unit which stores a plurality of icons and a plurality of dates while being associated with each other based on inputs through the input unit, wherein the display controller controls the display unit to display a plurality of period names corresponding to a plurality of first time periods; a selecting unit which selects a period name from among the period names displayed on the display unit;
an extracting unit which extracts an icon, which is associated with dates within the time period selected by the selecting unit from the icon storing unit;
an obtaining unit which obtains at least one of the one or more data files;
an acquiring unit which acquires a date relating to the at least one data file obtained by the obtaining unit; and
a determination unit which determines whether the icon storing unit stores the acquired date while being associated with any icons,
wherein the display controller controls the display unit to display the extracted icon, and
wherein the display controller controls the display unit to display the input screen in response to the determination unit determining that the icon storing unit does not store the acquired date while being associated with any icons.

15. An information processing apparatus comprising:
a first obtaining unit which obtains schedule information associating a plurality of dates with a plurality of icons;
a second obtaining unit which obtains a plurality of data files, each including date information; and
a controller which associates the plurality of data files with the plurality of icons based on the date information and the schedule information,
an obtaining unit which obtains a data file;
an acquiring unit which acquires a date relating to the data file obtained by the obtaining unit; and
a determination unit which determines whether the icon storing unit stores the acquired date while being associated with any icons,
wherein the controller controls a display unit to display an input screen for associating a date with at least one icon, the input screen indicating a name of the date and a thumbnail image of a data file relating to the date,
wherein the controller received an input indicating an association between the date and at least one icon, and generates the schedule information based on the received association, and
wherein the display controller controls the display unit to display the input screen in response to the determination unit determining that the icon storing unit does not store the acquired date while being associated with any icons.

16. The information processing apparatus according to claim 15, wherein the controller controls the display unit to display an icon which is associated with a date, the icon being associated with the data files based on the date information and the schedule information.

* * * * *